United States Patent
Huang et al.

(10) Patent No.: US 8,857,277 B2
(45) Date of Patent: *Oct. 14, 2014

(54) PRESSURE GAUGE AND PRESSURE DETECTING CIRCUIT THEREOF

(75) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Kuan-Chou Lin, Taichung (TW);
Yen-Jen Yen, Yunlin County (TW);
Chiang-Wen Lai, Taichung (TW)

(73) Assignee: Grand Mate Co., Ltd., Taichung (TW)

( * ) Notice: Subject to any disclaimer, the term of this patent is extended or adjusted under 35 U.S.C. 154(b) by 342 days.

This patent is subject to a terminal disclaimer.

(21) Appl. No.: 13/231,273

(22) Filed: Sep. 13, 2011

(65) Prior Publication Data

US 2013/0061690 A1    Mar. 14, 2013

(51) Int. Cl.
*G01L 1/12* (2006.01)

(52) U.S. Cl.
CPC ........................................ *G01L 1/12* (2013.01)
USPC ........................................ 73/862.69; 73/728

(58) Field of Classification Search
USPC .......... 73/862.69, 728, 862.68, 862.628, 721,
73/723, 722, 732, 733, 735, 741, 744, 745,
73/747, 749, 754, 756, 861.18, 521;
431/12, 89; 137/487.5; 702/50;
361/139, 143, 146, 147, 155, 156, 159,
361/160, 166, 187, 191, 4
See application file for complete search history.

(56) References Cited

U.S. PATENT DOCUMENTS

| | | | | |
|---|---|---|---|---|
| 2,510,073 | A * | 6/1950 | Clark | 336/30 |
| 2,669,124 | A * | 2/1954 | Roberts | 73/728 |
| 3,196,663 | A * | 7/1965 | Ziegler et al. | 73/701 |
| 3,253,467 | A * | 5/1966 | Ollivier et al. | 73/701 |
| 3,304,776 | A * | 2/1967 | Bennett et al. | 73/152.53 |
| 3,425,281 | A * | 2/1969 | Barz | 73/702 |
| 4,098,133 | A * | 7/1978 | Frische et al. | 73/702 |
| 6,669,909 | B2 * | 12/2003 | Shvets et al. | 422/502 |
| 6,742,994 | B2 * | 6/2004 | Hironaka et al. | 417/63 |
| 7,046,018 | B2 * | 5/2006 | Toda et al. | 324/679 |
| 7,194,909 | B2 * | 3/2007 | Kang et al. | 73/702 |
| 7,370,651 | B2 * | 5/2008 | Holder | 128/204.26 |
| 7,913,579 | B2 * | 3/2011 | Mizuno | 73/862.69 |
| 2010/0200084 | A1 * | 8/2010 | Lin et al. | 137/505.11 |
| 2013/0071797 | A1 * | 3/2013 | Huang et al. | 431/12 |
| 2013/0073225 | A1 * | 3/2013 | Huang et al. | 702/50 |
| 2013/0133420 | A1 * | 5/2013 | Huang et al. | 73/335.05 |

* cited by examiner

*Primary Examiner* — Hezron E Williams
*Assistant Examiner* — Marrit Eyassu
(74) *Attorney, Agent, or Firm* — Tracy M. Heims; Apex Juris, pllc

(57) ABSTRACT

The present invention provides a pressure detecting circuit, which is electrically connected to a coil to receive an induced electromotive force from the coil, including a movement detecting unit electrically connected to the coil to receive the induced electromotive force from the coil and find a distance of the movement of the magnetic device according to the induced electromotive force; and a converting unit electrically connected to the movement detecting unit to generate the voltage signal to indicate the distance. In addition, the present invention further provides a pressure gauge incorporated with the pressure detecting circuit.

4 Claims, 3 Drawing Sheets

PRESSURE GAUGE AND PRESSURE DETECTING CIRCUIT THEREOF

BACKGROUND OF THE INVENTION

1. Field of the Invention

The present invention relates generally to a sensor, and more particularly to a pressure gauge and a pressure detecting circuit incorporated in the pressure gauge.

2. Description of the Related Art

There are many pressure gauges, such as U-tube gauge and Bourdon-tube gauge, to measure tire pressure, atmospheric pressure, and water pressure etc.

The U-tube gauge provides water or mercury in a U-shaped tube. The surfaces of the mercury will be at the same level when the pressures on the opposite ends of the U-shaped tube are the same, and there will be a height difference between the mercury surfaces when the pressures are different. One may find the pressure according to the height difference.

A Bourdon-tube gauge has a copper alloy tube, which has an elliptical cross section and is bent into a curved shape. An end of the tube is connected to a connector. The distal end of the tube is closed, and there is a space for the tube to expand. When a pressure is transmitted to the tube through the connector, the curved tube will be extended. A link connects the distal end of the tube and a sector gear. The sector gear is provided with a pointer on a scale to show the value of pressure. In other words, the pressure may deform the tube to move the pointer through the link, and the pressure is directly proportional to the deformation of the tube that the movement of the pointer may indicate the pressure.

There are several drawbacks in the conventional pressure gauges, for example, the U-tube gauge has a poor precision in measurement, and the U-shaped tube usually is made of glass which is easy to be broken. Besides, the temperature in the U-shaped tube will affect the precision of measurement. For the Bourdon-tube gauge the temperature affects the precision of measurement also, and the material fatigue of the copper tube is another big problem.

To improve the conventional pressure gauges, a piezoelectric pressure gauge is provided. The piezoelectric pressure gauge has a piezoelectric material therein. The piezoelectric material may result in electricity from pressure that the piezoelectric pressure gauge may precisely detect pressure.

Temperature has less affection on the piezoelectric pressure gauge, and the piezoelectric pressure gauge may provide a precise measurement. However, the piezoelectric material is exposed under the pressure directly that rusting, moisture and other facts may damage the piezoelectric material. Because the piezoelectric material generates electricity that the piezoelectric pressure gauge cannot be used to sense inflammable gas. In conclusion, there still are some places in the art of pressure measurement that needs to be improved.

SUMMARY OF THE INVENTION

The primary objective of the present invention is to provide a pressure gauge and a pressure detecting circuit, which may provide a precise measurement and may be applied in all fields.

According to the objective of the present invention, the present invention provides a pressure gauge for measuring a pressure of a source includes a case having a bore connecting the source; a coil, which is made of a conductor, provided in the case; a magnetic device movably received in the case; and a pressure detecting circuit electrically connected to the coil. The magnetic device is moved by the pressure of the source that the coil generates an induced electromotive force, and the pressure detecting circuit receives the induced electromotive force to generate a voltage signal directly proportional to the induced electromotive force.

In an embodiment, the present invention further provides a pressure detecting circuit. The pressure detecting circuit is electrically connected to a coil to receive an induced electromotive force from the coil. The pressure detecting circuit includes a movement detecting unit electrically connected to the coil to receive the induced electromotive force from the coil and find a distance of the movement of the magnetic device according to the induced electromotive force; and a converting unit electrically connected to the movement detecting unit to convert the distance into the voltage signal.

DETAILED DESCRIPTION OF THE INVENTION

Figure 1:
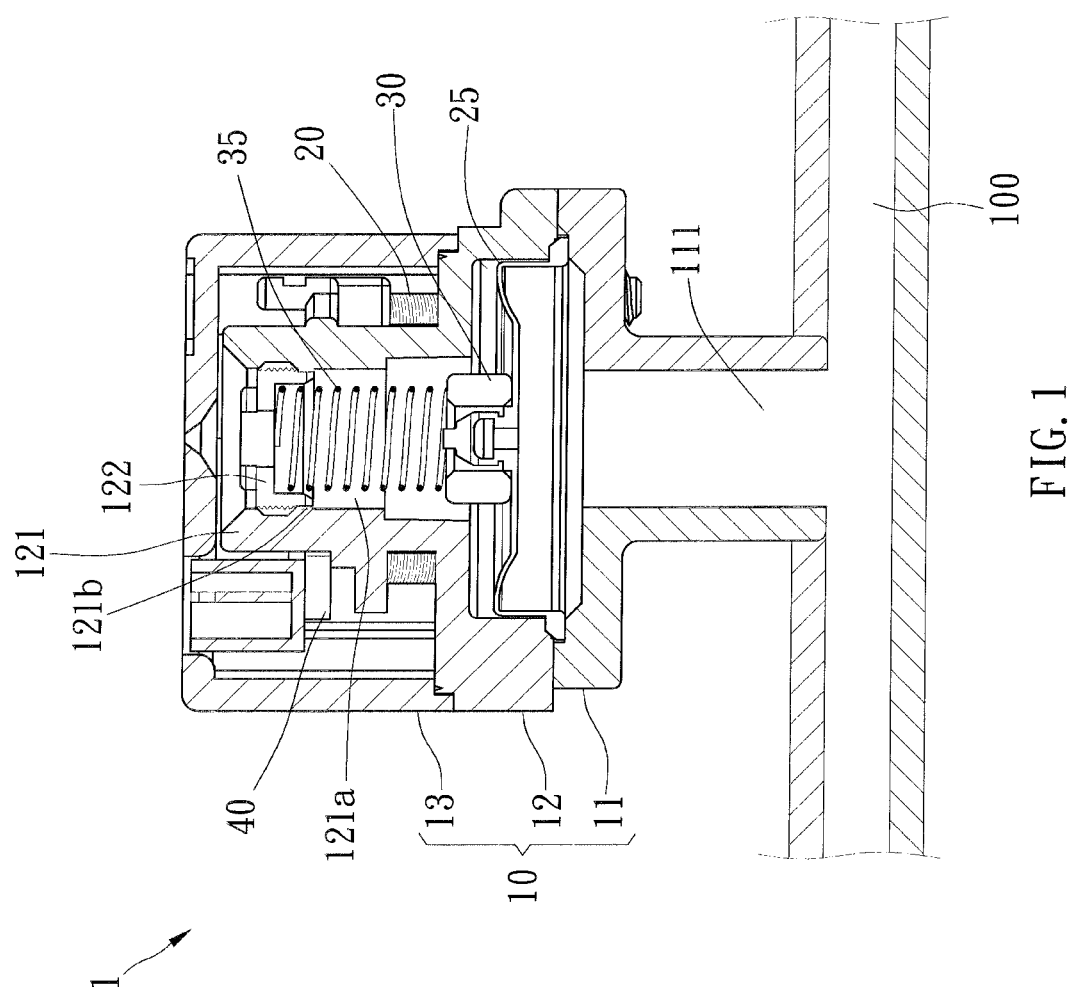
FIG. 1 is a sectional view of a preferred embodiment of the present invention.

FIG. 1 shows a pressure gauge 1 of the preferred embodiment of the present invention for measuring pressure of a source. The present embodiment is applied in measuring the pressure in a gas pipe 100, and, however, it may be applied in any other fields. The pressure gauge 1 includes a case 10, a coil 20, a flexible film 25, a magnetic device 30, a spring 35, and a pressure detecting circuit 40.

The case 10 has a base 11, a lid 12, and a shield 13. The base 11 has a bore 111 to connect the gas pipe 100 that gas in the gas pipe 100 may enter the case 10 via the bore 111. The lid 12 engages the case 10 which has a main member 121 and a knob 122. The main member 121 has a chamber 121a therein and a threaded hole 121b. The knob 122 engages the threaded hole 121b. The shield 13 engages the lid 12.

The coil 20 is made of a conductor, such as copper, iron, and silver. The coil 20 is received in the chamber 121a of the lid 12 and surrounds the main member 121.

The flexible film 25 is provided on an inner side of the base 11 to cover the bore 111 that the flexible film 25 may be expanded by the gas.

The magnetic device 30 is received in the chamber 121a and is able to be moved relative to the coil 20. The magnetic device 30 may be moved by the flexible film 25. In the present invention, the magnetic device 30 is a permanent magnet, and, however, it may be an electromagnet or other members with magnetism.

The spring 35 is received in the chamber 121a with opposite ends urging the knob 122 and the magnetic device 30 that the magnetic device 30 is adjustable by turning the knob 122.

Figure 2:
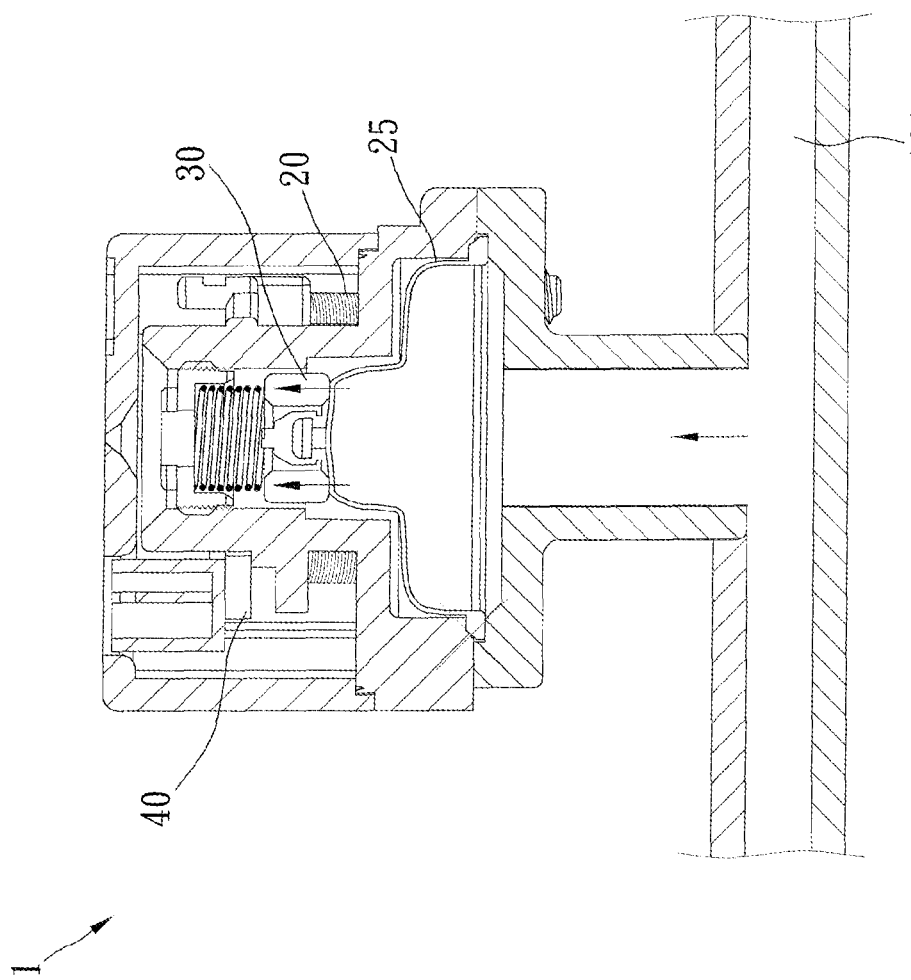
FIG. 2 is a sectional view of the preferred embodiment of the present invention, showing the pressure gauge detecting pressure.

The gas of the gas pipe 100 enters the case 10 via the bore 111 and expands the flexible film 25 to move the magnetic device 30 relative to the coil 20 (FIG. 2). A velocity of the magnetic device 30 is directly proportional to the pressure of the gas. The coil 20 generates an induced electromotive force because of the movement of the magnetic device 30, and the induced electromotive force is directly proportional to the velocity of the magnetic device 30.

Figure 3:
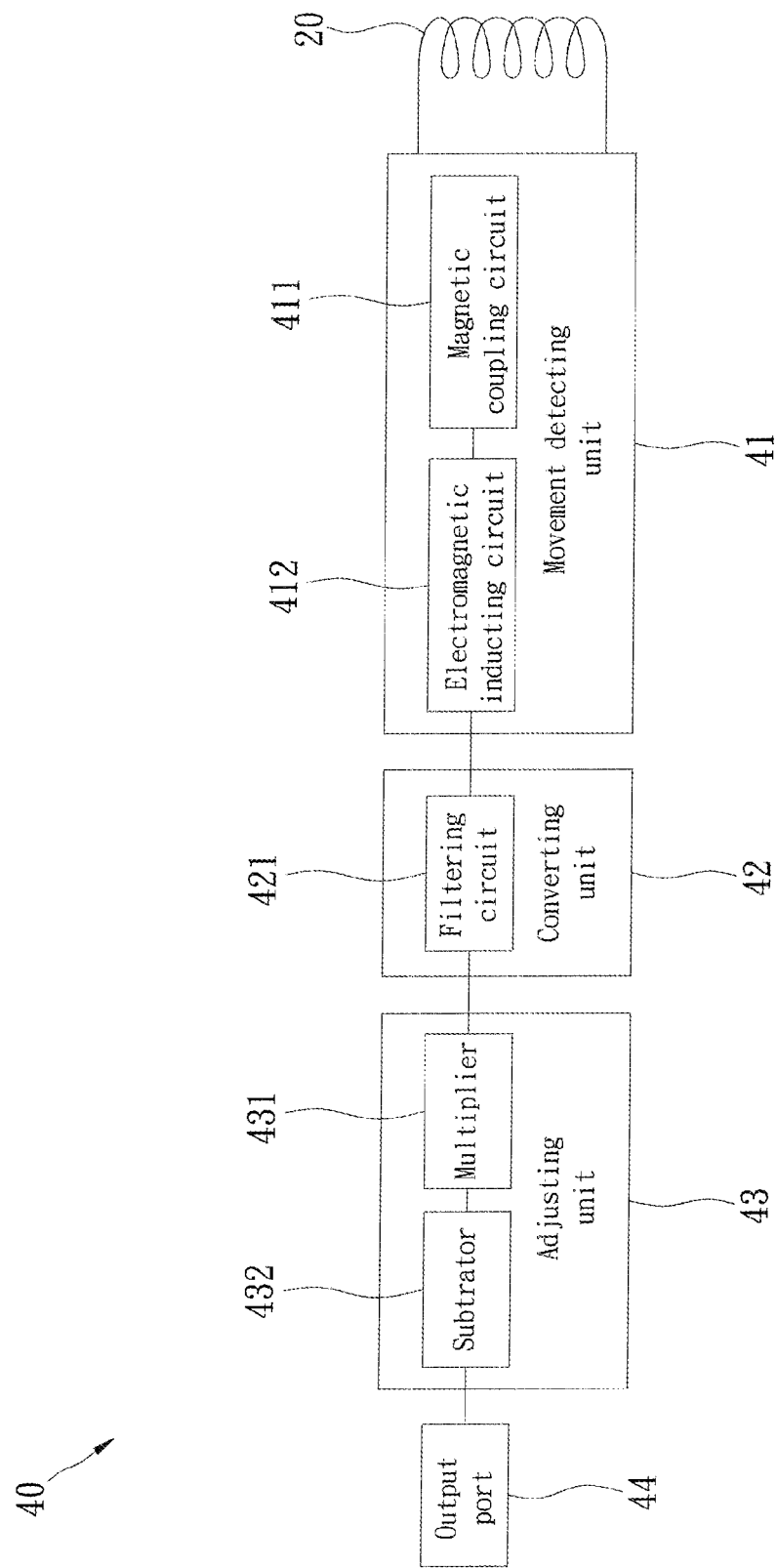
FIG. 3 is a block diagram of the pressure detecting circuit of the preferred embodiment of the present invention.

The pressure detecting circuit 40 is provided in the case 10 between the lid 12 and the shield 13. The pressure detecting circuit 40 is electrically connected to the coil 20. As shown in FIG. 3, the pressure detecting circuit 40 includes a movement detecting unit 41, a converting unit 42 electrically connected to the movement detecting unit 41, an adjusting unit 43 electrically connected to the converting unit 42, and an output port 44 electrically connected to the adjusting unit 43. The movement detecting unit 41 is electrically connected to coil 20 to receive the induced electromotive force from the coil 20 when the magnetic device 30 is moved and find a distance of the movement of the magnetic device 30. In the present invention, the movement detecting unit 41 includes a magnetic coupling circuit 411 and an electromagnetic inducting circuit 412 to find the moving distance of the magnetic device 30 according to the induced electromotive force.

The converting unit 42 generates a voltage signal according to the result of the movement detecting unit 41. The converting unit 42 has a filtering circuit 421 to filter noise, and/or unnecessary band of signal to provide a precise voltage signal.

The adjusting unit 44 may adjust the voltage signal from the converting unit 42. In the present invention, the adjusting unit includes a multiplier 431 and a subtractor 432 to zero, fine adjust, or amplify the voltage signal.

The output port 44 outputs the adjusted voltage signal.

Therefore, one may get the pressure of the source according to the voltage signal from the output port 44. For example, it will get a great voltage signal when the source provides a high pressure, and it will get a small voltage signal when the source provides a low pressure.

Besides, any slight movement of the magnetic device 30 may be detected by the electromagnetic detection that the pressure gauge may have a precise detection.

The present invention provides the flexible film 25 to isolate the gas of the source from the coil 20, the pressure detecting circuit 40, and other electronic/electric devices that these electronic/electric devices may not be damaged. Therefore, the pressure gauge 1 of the present invention may measure the pressure of gas, liquid, inflammable gas/liquid or any other pressure sources in all fields.

The description above is a few preferred embodiments of the present invention and the equivalence of the present invention is still in the scope of claim construction of the present invention.

What is claimed is:

1. A pressure gauge for measuring a pressure of a source, comprising:

a case having a bore connecting the source;

a coil, which is made of a conductor, provided in the case;

a magnetic device movably received in the case; and a pressure detecting circuit electrically connected to the coil;

wherein the magnetic device is moved by the pressure of the source that the coil generates an induced electromotive force, and the pressure detecting circuit receives the induced electromotive force to generate a voltage signal directly proportional to the induced electromotive force;

a flexible film provided on an inner side of the case to cover the bore that the pressure of the source expands the flexible film, and the flexible film moves the magnetic device;

a spring with opposite ends urging the case and the magnetic device, wherein the spring is compressed when the flexible film moves the magnetic device;

wherein the case includes a base and a lid engaging the base, and the base has the bore, and the lid has a chamber therein to receive the magnetic device and the spring therein;

wherein the lid has a main member with the chamber therein and a threaded hole communicated with the chamber, and a knob engaging the threaded hole to contact the spring that the magnetic device is adjustable by turning the knob; and wherein a spring force of the spring for urging the magnetic device is adjustable by turning the knob.

2. The pressure gauge as defined in claim 1, wherein the pressure detecting circuit includes a movement detecting unit electrically connected to the coil to receive the induced electromotive force from the coil and find a distance of the movement of the magnetic device according to the induced electromotive force, and a converting unit electrically connected to the movement detecting unit to convert the distance into the voltage signal.

3. The pressure gauge as defined in claim 2, wherein the pressure detecting circuit further includes an adjusting unit electrically connected to the converting unit to adjust the voltage signal from the converting unit.

4. The pressure gauge as defined in claim 3, wherein the pressure detecting circuit further includes an output port electrically connected to the adjusting unit to transmit the voltage signal out.

* * * * *